(12) United States Patent
Evans et al.

(10) Patent No.: US 9,197,911 B2
(45) Date of Patent: Nov. 24, 2015

(54) METHOD AND APPARATUS FOR PROVIDING INTERACTION PACKAGES TO USERS BASED ON METADATA ASSOCIATED WITH CONTENT

(71) Applicant: Gopop.tv, Leesburg, VA (US)

(72) Inventors: Eugene Evans, Philomont, VA (US); Dave Marsh, Charlottesville, VA (US); Jonathan Small, Charlottesville (BG); Chris Melissinos, Ashburn, VA (US); Karl Roelofs, Charlottesville, VA (US); Chris Brasted, Charlottesville, VA (US)

(73) Assignee: GOPOP.TV, Leesburg, VA (US)

( * ) Notice: Subject to any disclaimer, the term of this patent is extended or adjusted under 35 U.S.C. 154(b) by 0 days.

(21) Appl. No.: 13/770,724

(22) Filed: Feb. 19, 2013

(65) Prior Publication Data

US 2014/0068665 A1    Mar. 6, 2014

Related U.S. Application Data

(60) Provisional application No. 61/599,642, filed on Feb. 16, 2012.

(51) Int. Cl.
| | |
|---|---|
| G06F 3/00 | (2006.01) |
| G06F 13/00 | (2006.01) |
| H04N 5/445 | (2011.01) |
| H04N 21/235 | (2011.01) |
| H04N 21/478 | (2011.01) |
| H04N 21/81 | (2011.01) |

(52) U.S. Cl.
CPC ....... *H04N 21/2353* (2013.01); *H04N 21/4781* (2013.01); *H04N 21/8133* (2013.01)

(58) Field of Classification Search
CPC .......... H04N 21/2353; H04N 21/2555; H04N 21/40; H04N 21/4351; H04N 21/8166; H04N 21/81; H04N 21/235; H04N 21/43; H04N 21/47
USPC ................. 725/37, 40, 42, 52; 726/37, 40, 52
See application file for complete search history.

(56) References Cited

U.S. PATENT DOCUMENTS

| | | | |
|---|---|---|---|
| 7,493,341 B2 * | 2/2009 | Israel et al. ............................ 1/1 |
| 2002/0042920 A1 * | 4/2002 | Thomas et al. ................. 725/87 |
| 2007/0273488 A1 * | 11/2007 | Le et al. ..................... 340/323 R |
| 2008/0229352 A1 * | 9/2008 | Pino et al. ........................ 725/22 |
| 2012/0151509 A1 * | 6/2012 | McCarthy et al. ................ 725/9 |
| 2013/0014155 A1 * | 1/2013 | Clarke et al. .................... 725/32 |

* cited by examiner

*Primary Examiner* — Hai V Tran
*Assistant Examiner* — Tien M Nguyen
(74) *Attorney, Agent, or Firm* — Pillsbury Winthrop Shaw Pittman LLP

(57) ABSTRACT

The disclosed embodiments relate to a method, apparatus, and computer-readable medium for providing an interaction package to a user based at least in part on metadata associated with content. An exemplary method comprises processing metadata associated with content, determining information corresponding to an interaction package for a user based at least in part on the metadata, wherein at least a portion of the interaction package is associated with the content, and transmitting the information corresponding to the interaction package to at least one of one or more user computing devices. The disclosed embodiments further relates to a method, apparatus, and computer-readable medium for presenting at least a portion of an interaction package to a user based at least in part on metadata associated with content.

30 Claims, 12 Drawing Sheets

METHOD AND APPARATUS FOR PROVIDING INTERACTION PACKAGES TO USERS BASED ON METADATA ASSOCIATED WITH CONTENT

RELATED CASE INFORMATION

This application claims priority to U.S. Provisional Application No. 61/599,642, filed Feb. 16, 2012, which is hereby incorporated by reference in its entirety.

FIELD OF THE INVENTION

The invention relates to a method and apparatus for providing interaction packages to users based on metadata associated with content.

SUMMARY

The disclosed embodiment relates to a computer-implemented method executed by one or more computing devices for providing an interaction package to a user based at least in part on metadata associated with content. An exemplary method comprises processing metadata associated with content, determining information corresponding to an interaction package for a user based at least in part on the metadata, wherein at least a portion of the interaction package is associated with the content, and transmitting the information corresponding to the interaction package to at least one of one or more user computing devices. According to the disclosed embodiment, at least a portion of the interaction package may be presented to the user by at least one of the one or more user computing devices.

The exemplary method may also comprise receiving at least a portion of the metadata, and the metadata may be received from at least one of a content provider, a metadata provider, one or more users, and an external source. In addition, at least a portion of the metadata may be received in response to a request for metadata transmitted by at least one of the one or more computing devices executing the method to an external source.

The exemplary method may also comprise receiving user-generated data from at least one of the one or more user computing devices based at least in part on the interaction package. The user-generated data may include data generated by an interaction between the user and at least one of the one or more user computing devices. The exemplary method may further comprise transmitting additional information corresponding to an additional interaction package for the user to at least one of the one or more user computing devices, wherein at least a portion of the additional interaction package is associated with the user-generated data. The additional interaction package may not be associated with the content.

The disclosed embodiment also relates to a computer-implemented method executed by one or more computing devices for presenting at least a portion of an interaction package to a user based at least in part on metadata associated with content. An exemplary method comprises processing information corresponding to an interaction package associated with content, wherein the interaction package is based at least in part on metadata associated with the content, and presenting at least a portion of the interaction package to a user while the user is experiencing the content.

The exemplary method may also comprise receiving input from the user based at least in part on the interaction package, and storing the input as user-generated data. The user-generated data may include data generated by an interaction between the user and at least one of the one or more computing devices. The exemplary method may further comprise transmitting the user-generated data to at least one of one or more external computing devices. The exemplary method may also include processing additional information corresponding to an additional interaction package for the user, wherein at least a portion of the additional interaction package is associated with the user-generated data. The additional interaction package may not be associated with the content.

The metadata may include at least one of content title, content description, closed captioning, images, pointers, tags, and keywords associated with the content, and may be generated by at least one of the one or more computing devices executing the method. The content may include at least one of video content, audio content, images, a 3-D model, text, and software. In addition, the interaction package may be at least one of a game, an educational application, and an interactive application.

The disclosed embodiment also relates to apparatus comprising one or more processors and one or more memories operatively coupled to at least one of the one or more processors. The memories of an exemplary apparatus have instructions stored thereon that, when executed by at least one of the one or more processors, cause at least one of the one or more processors to carry out the steps of the exemplary methods.

The disclosed embodiment further relates to non-transitory computer-readable media storing computer-readable instructions that, when executed by at least one of one or more computing devices, cause at least one of the one or more computing devices to carry out the steps of the exemplary methods.

DETAILED DESCRIPTION

Figure 1:
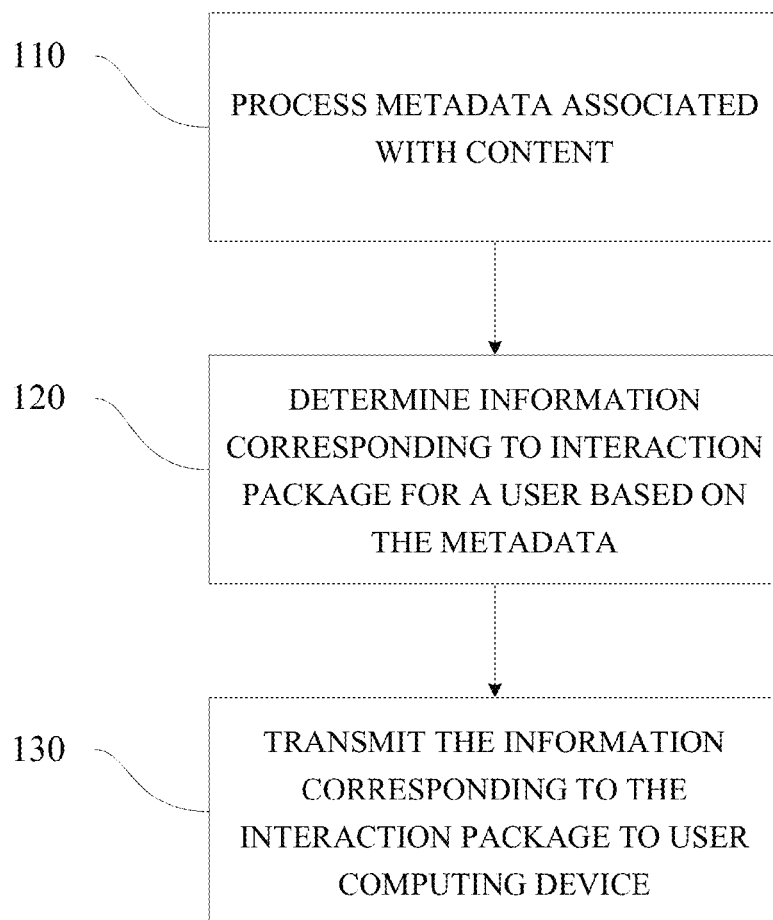
FIG. 1 illustrates an exemplary method for providing an interaction package to a user based at least in part on metadata associated with content according to the disclosed embodiment.

As described above, the disclosed embodiment relates methods, apparatus, and computer-readable media for providing interaction packages to users based on metadata associated with content. The disclosed embodiments further relates to methods, apparatus, and computer-readable media for presenting interaction packages to users based at least in part on metadata associated with content. Content, as described herein, can include any digital content displayed or presented on a computing device, such as a TV, interactive TV, smartphone, tablet, or any other suitable computing device. Content can also include live events that are experienced by a user, such as concerts, comedy shows, plays, shows, sporting events, seminars, and the like. The methods of the disclosed embodiment can be used with any type of content that can have metadata associated therewith.

Generally speaking, the disclosed embodiment relates to creating interaction packages (otherwise referred to herein as entertaining experiences) utilizing metadata (that either currently exists or is created by individuals or generated programmatically) or by utilizing data resulting from those entertainment experiences to in turn create new experiences (user-generated data for example). These entertainment experiences may be played or viewed on a television, or similar monitor, or another device such as a PC, tablet or smart phone or, more specifically devices supporting "Second Screen", "Social TV" and/or "Synchronized TV".

The embodiments described herein can be used in conjunction with interactive computing devices such as standard interactive television (Standard interactive TV), which represents a continuum from low interactivity (e.g. television on/off, volume, changing channels) to moderate interactivity (e.g. simple movies on demand without player controls) and high interactivity in which, for example, an audience member affects the program being watched. An example of this technology is real-time voting on screen, in which audience votes create decisions that are reflected in how the show continues. Also, for standard interactive TV, a return path to the program provider is not necessary to have an interactive program experience. Once a program is downloaded, for example, controls may all be local. The link was needed to download the program, but texts and software which can be executed locally at the set-top box or IRD (Integrated Receiver Decoder) may occur automatically, once the viewer enters the channel.

In addition, the embodiments described herein can be used in conjunction with multiple computing devices to create a "second screen" experience, which refers to an experience between two screens. In this case, the first screen could be a television and the second screen could be a PC, tablet, mobile phone or some other device connected to a server or executing another application. These applications may be synchronized with content displayed on computing devices, such as televisions or interactive TVs, whether it is live or pre-recorded and rebroadcast. Two-screen Second Screen TV applications generally do not require additional set top box hardware but rely instead on Internet or delivery from servers through a wireless/mobile phone to coordinate user interactions or data display with the Second Screen. While the second screen may be on a second device, the second screen as described herein may also be included as a display element on the first screen.

Metadata, as described herein, refers to digital information embedded or delivered as a separate download that is attributed with related media. Metadata contains information including, but not limited to, the video title, running time, video description, rating, key words, closed captioning. This information is often embedded in various media including, but not limited to, television shows, movies, web pages and songs and may be searchable or made available to technologies that read such data. For example, metatags (which are a form of metadata) are found embedded in web pages so that search engines can help users find the information they seek (for example, a web page for Stephen King's website might have the metatags "Stephen King, horror, Carrie, novelist, and book."). By way of additional example, television on-screen channel guides utilize metadata to display all pertinent information to a user regarding channel line-ups and content is available at any given time, helping them to determine what they want to watch.

In the media programming world, metadata can be described as "Guide or Descriptive Metadata" and used to both tag media with information and help humans find specific items and is usually expressed as a set of keywords in a natural language. This type of metadata serves a variety of functions. For example, descriptive metadata can identifies the media (e.g. clip or playlist names, duration, timecode, etc.), describe the content (e.g. notes regarding the quality of video content, rating, description (for example, during a sport event, keywords like goal, red card will be associated to some clips)), classify media (e.g. metadata allow to sort the media or to easily and quickly find a video content (i.e. a TV news could urgently need some archive content for a subject)), and the like.

Metadata may also include classifiers, for example, identifier number, title/name, genre (e.g. feature film, sitcom, sports broadcast, documentary, reality show, etc.), type (e.g. first run, best bet, rerun, etc.), ratings, positive content (true or false), program service (e.g. Bravo, CBS, etc.), service ID, bylines, original air date, current air date, language(s), media (e.g. film, web, HD, broadcast, etc.), summary/description, synopsis', images/photographs/video, cast (e.g. actors, characters, bios, etc.), statistics, production crew (e.g. directors, producers, writers, etc.), other keywords (e.g. cheetahs, chainsaws, etc.), awards, time-stamped information (e.g. images, audio, text, objects, etc.), bounding boxes (e.g. time stamped areas), and the like.

When the content itself is a live event, metadata can include, for example, an identification of the content, duration, date, description of the content, classification of the content, ratings, summary/description, synopsis', images/photographs/video, cast (e.g. characters, performers, athletes, bios, etc.), statistics, production crew (e.g. directors, producers, writers, etc.), other keywords (e.g. cheetahs, chainsaws, etc.), awards, time-stamped information (e.g. images, audio, text, objects, etc.), bounding boxes (e.g. time stamped areas), and the like.

Metadata can come from a variety of sources. For example, user-generated metadata refers to metadata related to an output of a user or viewers interaction with content, company created metadata refers to metadata or other resulting data created internally within a company or through its affiliates, purchased or licensed metadata refers to metadata or resulting data that is purchased or licensed from a $3^{rd}$ party, automatically generated metadata refers to metadata generated or modified by software, and the like. Any type of metadata from any source can be utilized in the methods of the disclosed embodiment.

In addition to traditional metadata, resulting metadata can be generated as a result of a user interacting with content. This metadata can be generated by individuals or generated programmatically, may be created by direct input (e.g. being asked to generate a list of words or taking a poll), may be created by indirect input or behavior as a result of interacting with content, and the like.

Creating Interaction Packages Utilizing Metadata

The disclosed embodiment enables an interaction package or entertaining experience to be provided to a user based on metadata associated with content. For example, if a user is watching a movie on television, the interaction package would preferably be based on metadata associated with that particular movie. According to the disclosed embodiment, an interaction package can be designed, modified, or identified, for a user based on the metadata associated with the content, and at least a portion of the interaction package is preferably associated with the content itself. Thus, in the movie example, the interaction package could be associated with the content itself, not just associated with the metadata associated with the content. Information corresponding to the interaction package can then be sent to a user device for use by the user.

FIG. 1 illustrates an overview of an exemplary method for providing an interaction package to a user based at least in part on metadata associated with content according to the disclosed embodiment. As shown in FIG. 1, metadata associated with content is processed in step 110. Information can then be determined in step 120 corresponding to an interaction package for a user based on the metadata. It is preferable for at least a portion of the interaction package to be associated with the content. The information corresponding to the interaction package is then transmitted in step 130 to a user computing device. The interaction package may then be presented to the user by the user computing device, for example.

Figure 2:
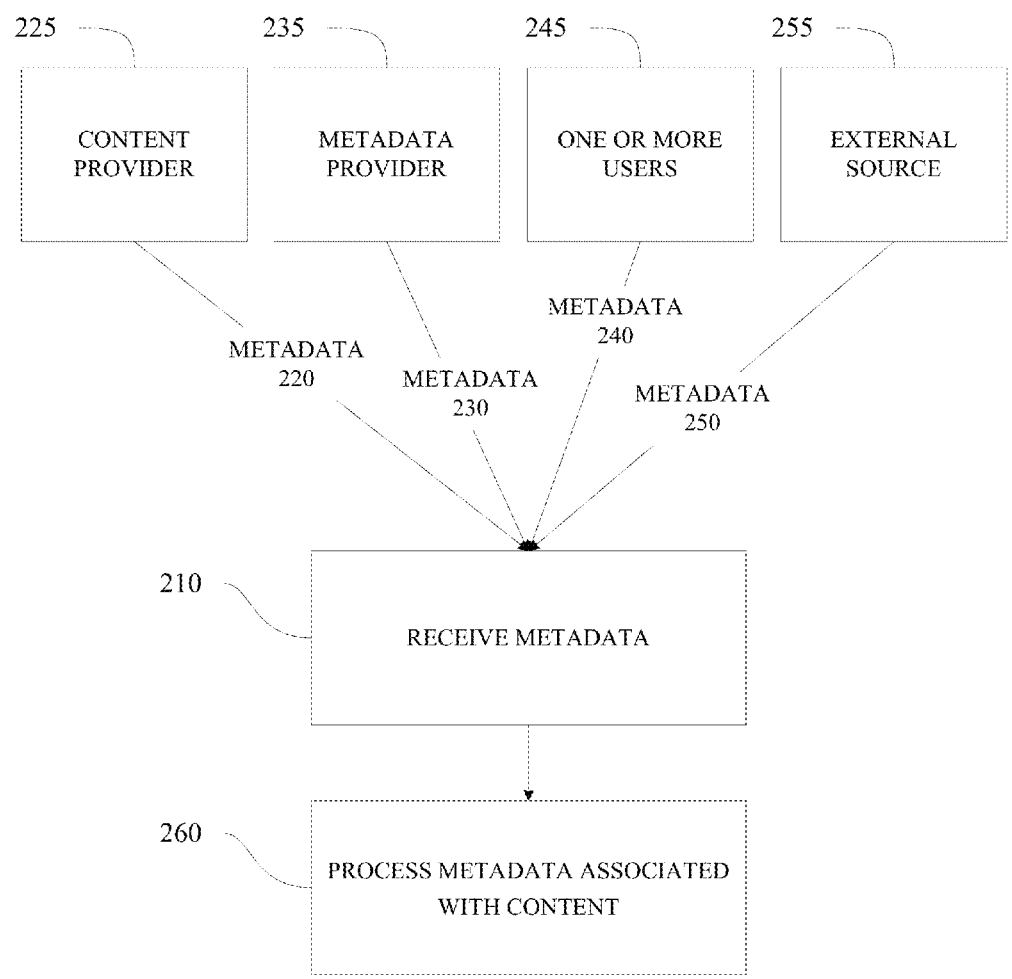
FIG. 2 illustrates how the metadata utilized in the method illustrated in FIG. 1 may be received according to the disclosed embodiment.

FIG. 2 illustrates how the metadata utilized in the method illustrated in FIG. 1 may be received according to the disclosed embodiment. As shown in FIG. 2, the metadata utilized in the method illustrated in FIG. 1 may be received in step 210 by any computing device executing the method. For example, metadata 220 may be received from content provider 225, metadata 230 may be received from metadata provider 235, metadata 240 may be received from one or more users 245, and metadata 250 may be received from any external source 255. After the metadata is received, the metadata is processed in step 260, and the method can continue as described above and illustrated in FIG. 1.

Figure 3:
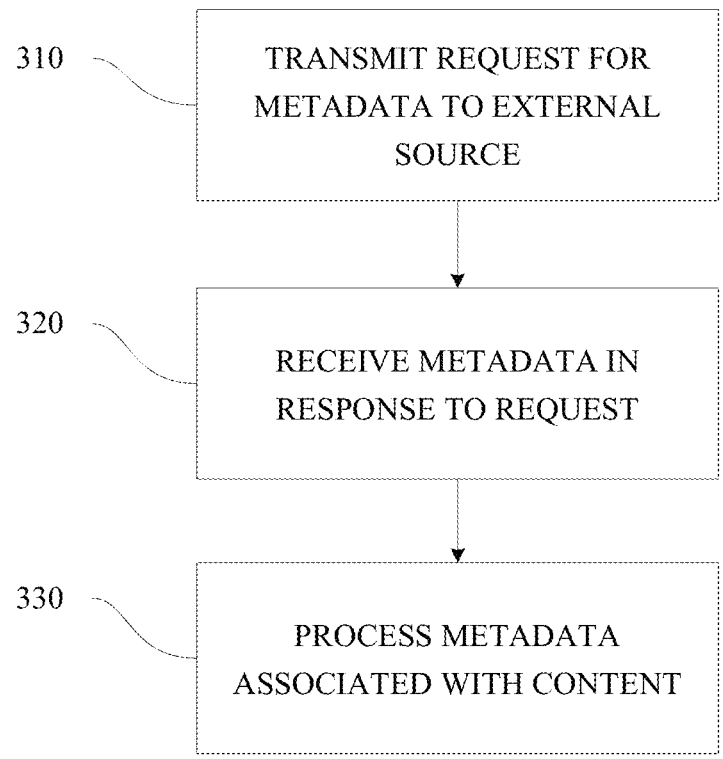
FIG. 3 illustrates that how the metadata utilized in the method illustrated in FIG. 1 can be obtained according to the disclosed embodiment.

In addition, FIG. 3 illustrates that how the metadata utilized in the method illustrated in FIG. 1 can be obtained according to the disclosed embodiment. As shown in FIG. 3, the metadata utilized in the method illustrated in FIG. 1 can be obtained by first submitting a request in step 310 to an external source, and then, in step 320, receiving metadata in response to the request. The external source may include any metadata source described herein including, but not limited to, content providers, metadata providers, users, and the like.

Figure 4:
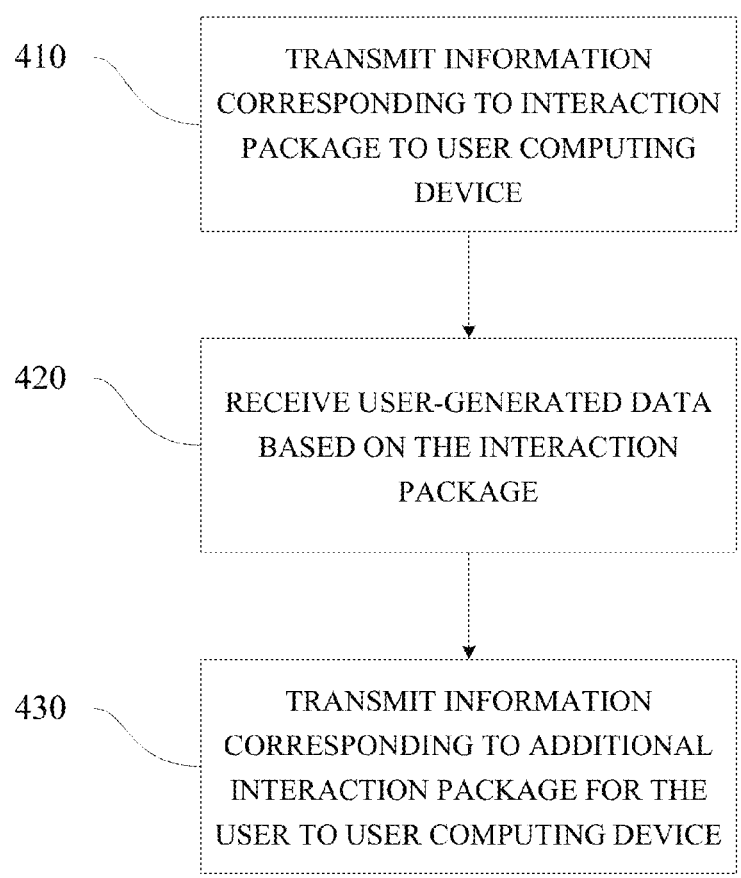
FIG. 4 illustrates how user-generated data may be received according to the disclosed embodiment.

Furthermore, FIG. 4 illustrates how user-generated data may be received according to the disclosed embodiment. As shown in FIG. 4, after information corresponding to an interaction package is transmitted to a user computing device in step 410 (Step 130 in FIG. 1), user-generated data may be received in step 420 from a user computing device, for example, based on the interaction package. The user-generated data preferably includes data generated by an interaction between the user and a user computing device. Additional information corresponding to an additional interaction package for the user may then be transmitted in step 430 to a user computing device. The additional interaction package is preferably associated with the user-generated data, although the additional interaction package may or may not be associated with the content.

Figure 5:
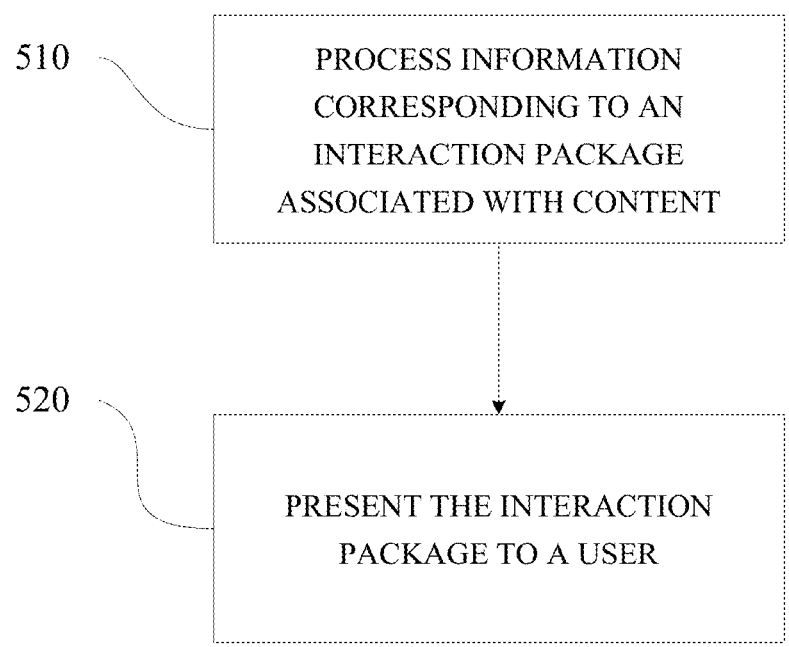
FIG. 5 illustrates an exemplary method for presenting an interaction package to a user based at least in part on metadata associated with content according to the disclosed embodiment.

FIG. 5 illustrates an exemplary method for presenting an interaction package to a user based at least in part on metadata associated with content according to the disclosed embodiment. As shown in FIG. 5, information corresponding to an interaction package associated with content is processed in step 510. The interaction package is preferably based at least in part on metadata associated with the content, and the information may be received, requested, or otherwise obtained, or may already be stored on a user device. The interaction package can then be presented to a user while the user is experiencing the content in step 520.

Figure 6:
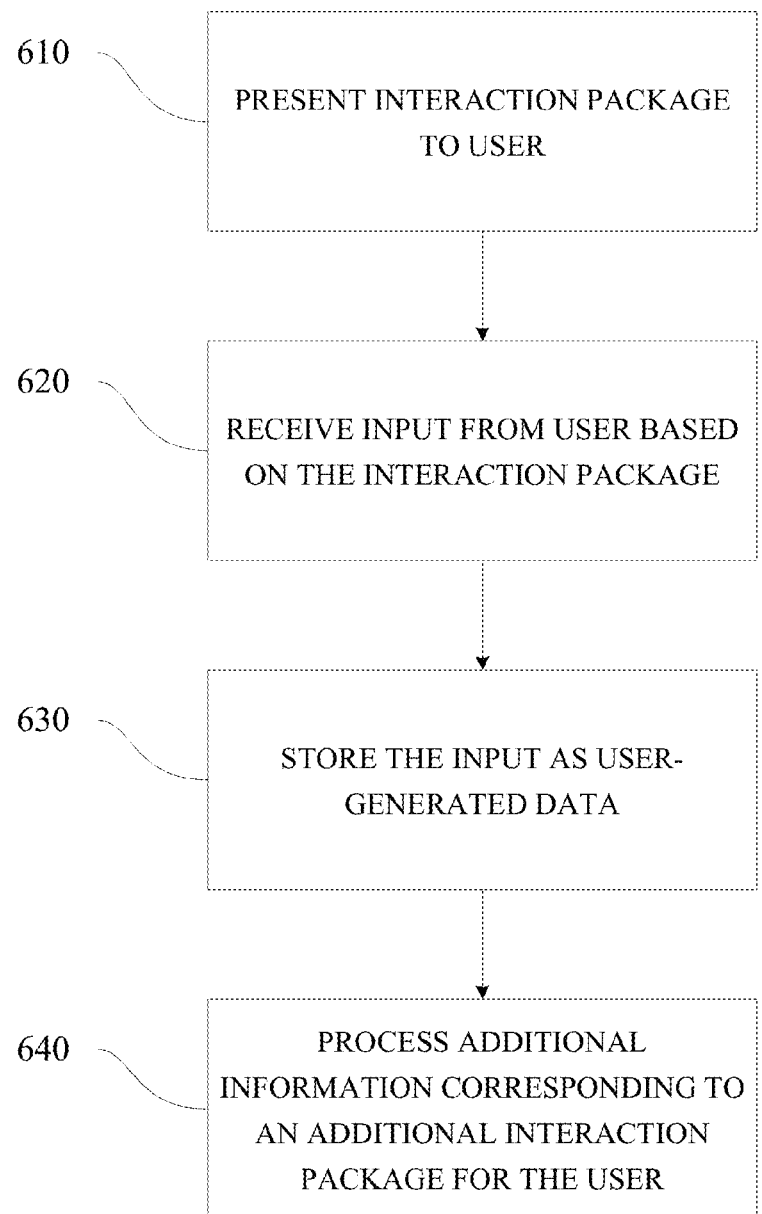
FIG. 6 illustrates how input may be received from a user according to the disclosed embodiment.

FIG. 6 illustrates how input may be received from a user according to the disclosed embodiment. As shown in FIG. 6, after the interaction package is presented to the user in step 610, input may be received from the user in step 620 based at least in part on the interaction package. The input may be stored in step 630 as user-generated data. The user-generated data may include data generated by an interaction between the user and at least one of the one or more computing devices. The exemplary method may further processing, in step 640, additional information corresponding to an additional interaction package for the user, wherein at least a portion of the additional interaction package is associated with the user-generated data. The method may also include transmitting the user-generated data to an external computing device and receiving the additional information from an external computing device. It is preferably for at least a portion of the additional interaction package to be associated with the user-generated data, but the additional interaction package may or may not be associated with the content.

By using metadata associated with content to enable the creation of an interaction package or entertainment experience, an interactive experience can be presented to a user, for example, on a second screen that the user is using. The resulting entertainment experience uses metadata to present the user with challenges, problems, games, and the like to complete individually or in which to compete. There is no need for the entertaining experience or interaction package to exist prior to the broadcast of the content, in contrast to games that are designed specifically designed or created utilizing custom data associated with a TV show, for example.

Figure 7:
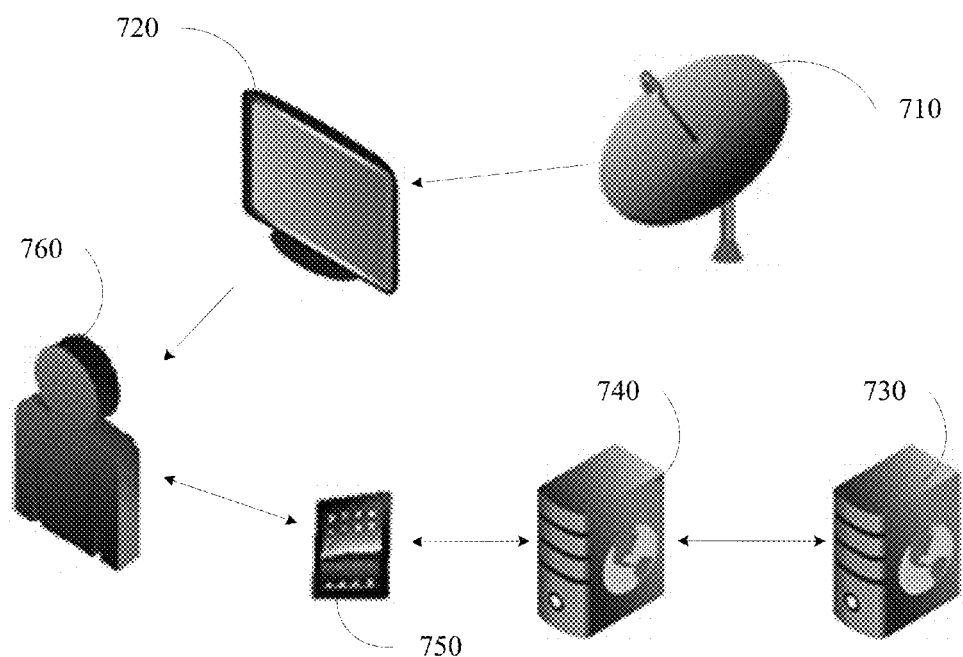
FIG. 7 illustrates how metadata can be used in its simplest form to create an interaction or entertaining experience according to the disclosed embodiment.

FIG. 7 illustrates how metadata can be used in its simplest form to create an interaction or entertaining experience. As is shown in FIG. 7, content from media provider 710 can be displayed on display device 720. The content can be presented in any suitable way to display device 720, which can include a television (cable, satellite, etc.), interactive TV, or any other computing device. Metadata can be acquired by a metadata provider via program data feed 730, for example, or any other suitable source, and stored and/or processed by metadata storage 740, which can include any type of storage, such as a game server, any type of internal or external storage, or any type of removable storage. The interactive package or information associated with the entertaining experience can then be sent to user computing device 750, which may be any type of computing device, including, for example, a tablet, smartphone, computer, interactive TV, and the like, for presentation to user 760. The entertainment experience can be loaded or streamed to the user computing device in any suitable fashion. The user computing device is now a second screen computing device since the user is also watching the content on display device 720. Regardless of the actual media content or the availability of broadcast metadata, users can interact with the interactive package (on various devices) either standalone or in conjunction with the media content in both synchronized and non-synchronized ways. When user 760 interacts with the user computing device 750, additional metadata or resulting data can be produced. This data can then be stored in metadata storage 740, for example, to be exploited in current or additional products or used for other commercial purposes.

Sources of Metadata

Figure 8:
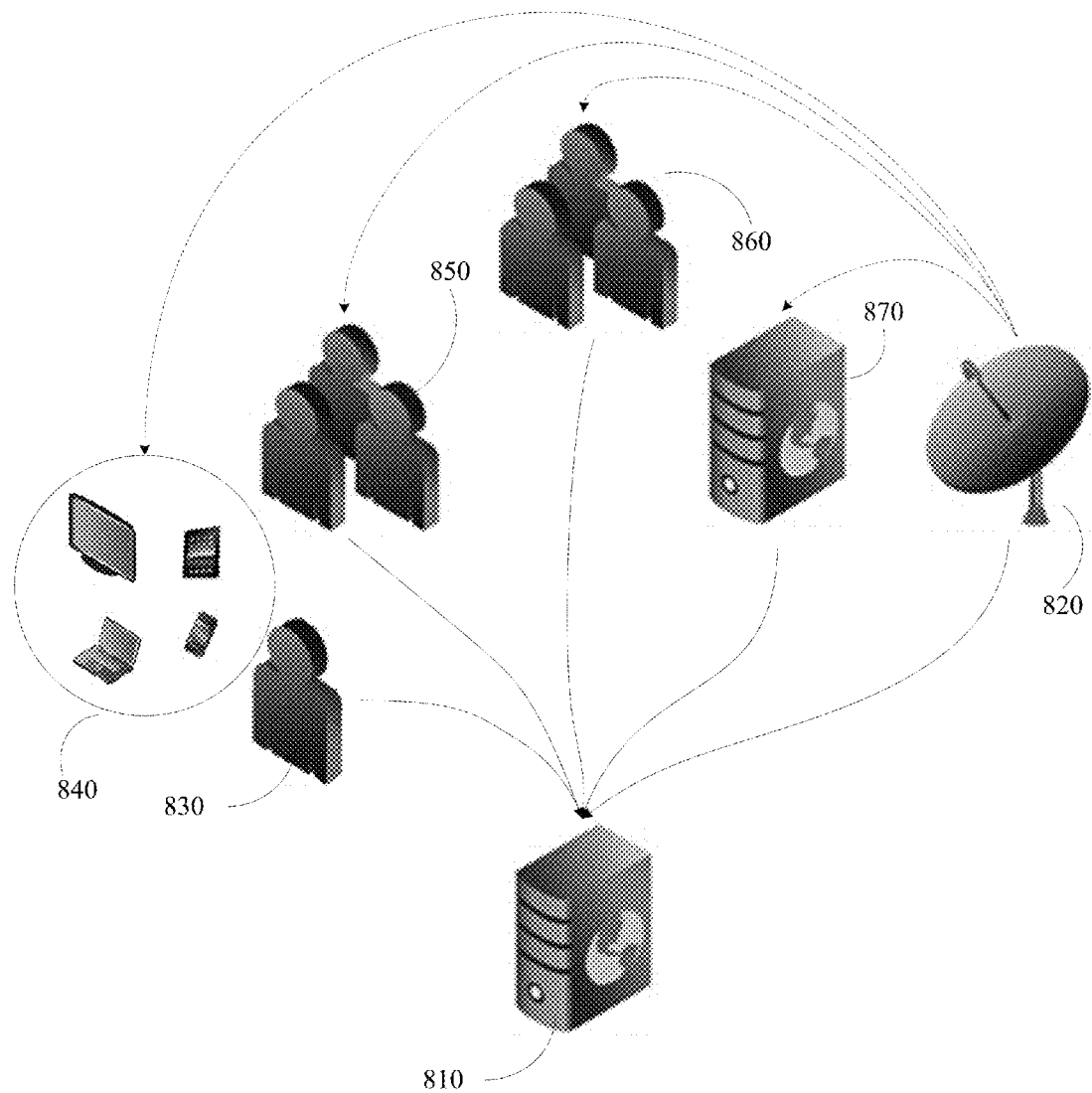
FIG. 8 illustrates how metadata can be obtained according to the disclosed embodiment.

FIG. 8 illustrates how metadata can be obtained and downloaded, streamed or uploaded to servers (and subsequently uploaded to client software on enabled devices) through various means. As shown in FIG. 8, metadata storage 810, which can include any type of storage, such as a game server, any type of internal or external storage, or any type of removable storage, can obtain metadata associated with content from a variety of sources including, for example, media provider 820, user 830 via user computing devices 840, manual metadata input 850, automated metadata input 860, metadata provider 870, any number of automated tools, and the like. Media provider 820 can also function to provide the content itself to any of user computing devices 840, manual metadata input 850, automated metadata input 860, metadata provider 870, and the like. All of the metadata (input, bought, or licensed) is preferably stored in some fashion (static or transient) to be used in conjunction with software developed for entertainment purposes. More specifically, and as described above with reference to FIGS. 4 and 6, user 830 can enrich existing metadata or generate new metadata (either directly or indirectly) as well as resulting data from their experiences with the interaction packages. The metadata collected from these and other processes can then be stored in metadata storage 810 for future exploitation as needed.

While metadata storage 810 is illustrated in FIG. 8 as being located in a separate computing device, metadata storage 810 can be integral with, or be in communication with, any of user computing devices 840. In this scenario, metadata can be provided or obtained by metadata storage 810 from any source, for example, a removable storage device (i.e. a CD, a USB storage device, a SD card, etc.), downloaded or pushed from a remote source, either through a direct connection or wirelessly, and the like.

User-Generated Metadata

In addition to entertainment experiences that utilize existing metadata, the disclosed embodiment utilizes user-generated metadata (as noted above with reference to FIGS. 4 and 6). The ability for users to initiate or engage in interactive experiences or gameplay that drive the submission of metadata and deliver meaningful content to the user allows for the expansion of the metadata collection process, and enriches the experiences for the user. For example, user-generated metadata can be used to provide entertainment, rewards, relevant advertisements, relevant connection to other users who have common interests, recommendations for programming, recommendations for products that relate to the programming, and the like.

User generated metadata may or may not be tied to the content that is being observed by the user. Methods for synchronizing the data and content may include, for example, audio content recognition (ACR), network or digitally based identification, data streams from service providers, networks, carriers, internet service providers, cable companies, content streaming services, content producers, associations identified by the users themselves, and the like. The outcome of the data used within the interactive experience can then be captured and stored locally or on servers or simply accessed by companies that already parse and maintain metadata. This metadata can be analyzed and made available to content creators, product manufacturers, marketing organizations, and game developers and used to define more targeted products, services, advertising, and the like.

Many types of interactive experiences would encourage generation of user-generated metadata including, for example, voting games, search games, word games, trivia games, match-3 games, drawing games, and multiple choice games. These games may be developed in the form of applications (apps) or within a platform architecture and can be downloaded onto various devices (mobile, tablets, PCs) or available on the interactive TV or television platforms themselves. These applications can be played individually as stand-alone experiences or in conjunction with other users. This content can be accessed via streaming, download or instant access on interactive TV devices delivered through mobile airwaves, WIFI, Bluetooth or hardwire. While the games are designed to be synced with various interactive TV media content providers (interactive TV, cable, satellite) and/or game servers and/or social media services/servers, they may also be played in time-delayed fashion, utilizing existing and user-generated data and metadata.

Figure 9:
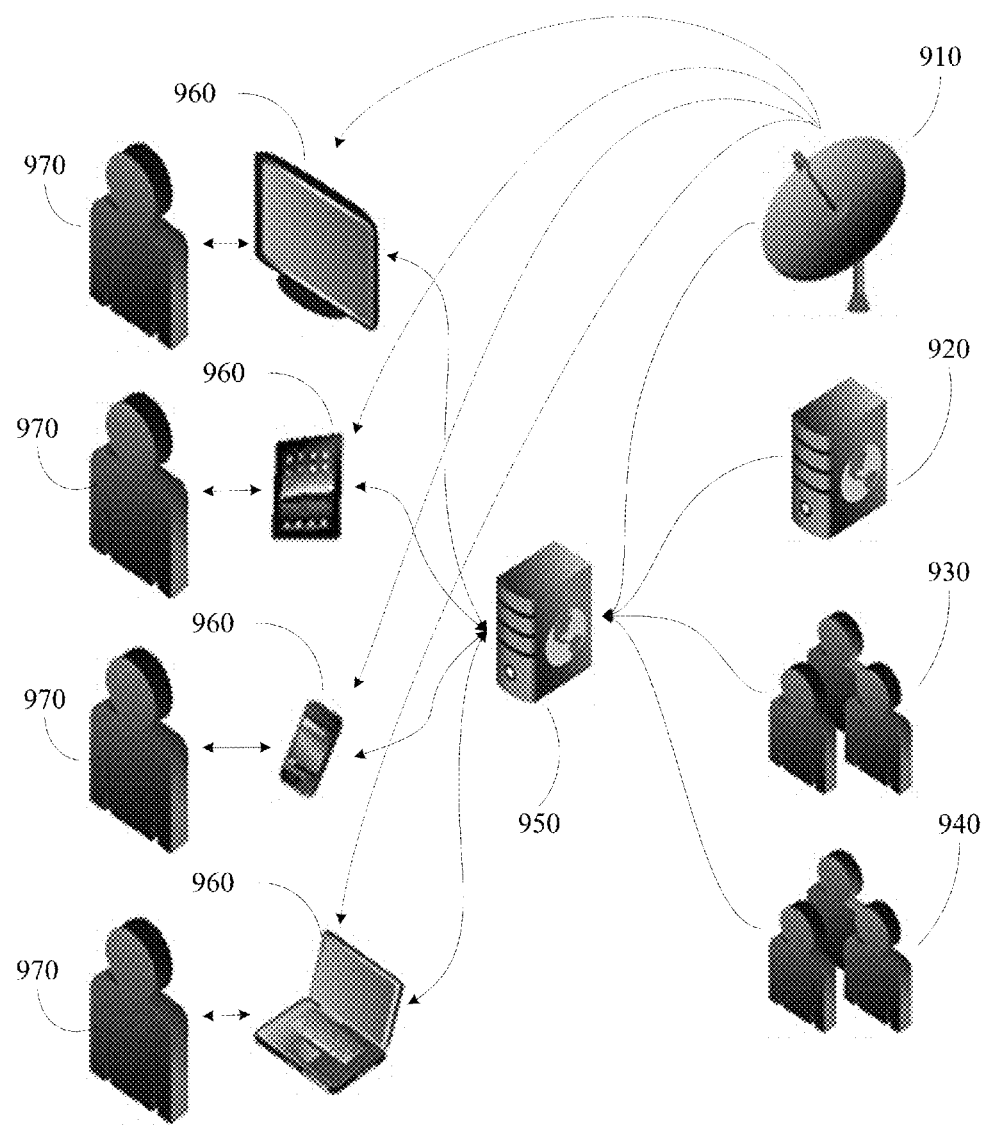
FIG. 9 illustrates an exemplary cycle of metadata according to the disclosed embodiment.

FIG. 9 illustrates an exemplary cycle of metadata including user-generated metadata according to the disclosed embodiment. Content is broadcast to the user in some way (cable, satellite, etc.) from media provider 910 to a user computing device 960, which can be a television/interactive TV, tablet, smartphone, or any other type of computing device. Based on the content, metadata is acquired, enriched, or generated by a metadata provider 920, enriched or generated by manual app developers 930, enriched or generated automatically by automatic app developers 940, and the like and stored on metadata storage 950, which can include any type of storage, such as a game server, any type of internal or external storage, or any type of removable storage. The interactive packages or entertaining experiences can then be loaded or streamed to any of user devices 960. Users 970 can then interact with user devices 960, thereby producing additional metadata or resulting data. This data can then be stored in metadata storage 950 to be exploited in current or additional products or used for other commercial purposes.

Interaction Packages and Entertaining Experiences

There are many exemplary interactive packages and entertaining experiences that can involve games. These generally fall into two categories: dependent or independent.

Dependent interactive packages and entertaining experiences are tied specifically to a single source of content/programming delivered via interactive TV devices. For instance, a game may be linked to a specific TV episode (e.g., users would play a game surrounding a single episode of Seinfeld).

Independent interactive packages and entertaining experiences are not tied to a single source of content but utilizes other channels or media (web, apps, etc.) to accomplish an objective. For instance, a game may require surfing from channel to channel or to web pages searching for clues.

Figure 10:
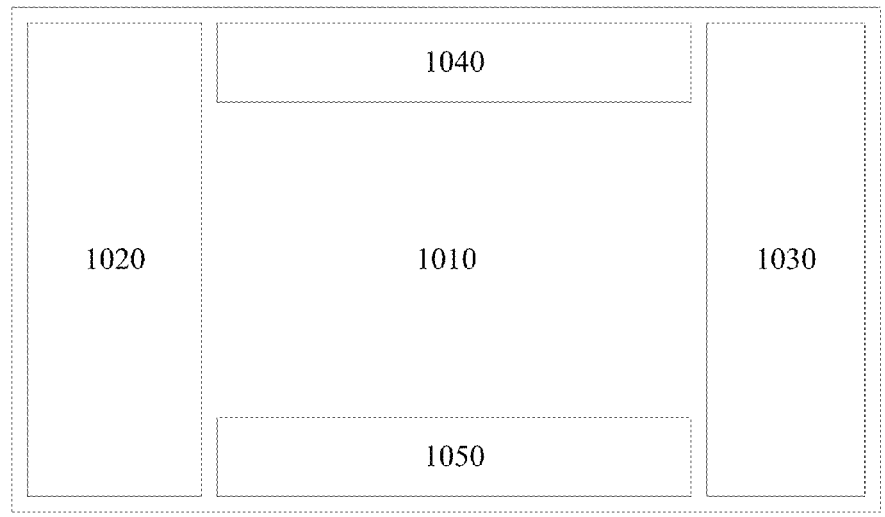
FIG. 10 illustrates an exemplary interface according to the disclosed embodiment.

FIG. 10 illustrates an exemplary interface in which the interaction packages or entertaining experiences according to the disclosed embodiment are presented on a user device that is also displaying the content. As shown in FIG. 10, the interface is presented on a display 1010, such as a television/interactive TV or monitor. The content on it is broadcast video or video playback or animation or some other digital or cable television programming, film or documentary, etc. On display 1010, entertaining experience or interactive package overlay 1020 may contain/display pictures, photographs or icon representations, text, questions, answers or other information. This content is added to entertaining experience or interactive package overlay 1020 through various inputs including download, digital streaming, via an analog device or other peripheral devices including apps or other programs developed on mobile devices, tablets, notebooks or netbooks. Community overlay 1030 may display community-related information and be directly tied to users/players that are either connected directly through social media applications, other applications, video applications, cameras, mobile applications, instant messaging, text, Twitter or inputted in some other manner. Content associated with users/players can be displayed as video, photographs, images, icons, or text. Scoring overlay 1040 may include information related to scores, and may be tied directly to how users/players (e) have completed the objectives of the entertaining experience or interactive package. This may include rankings, current scores, leaderboards, historical results, etc. This content can be added to scoring overlay 1040 through various inputs including download, digital streaming or via an analog device. Advertising overlay 1050 displays advertising in any form, such as text, images, or video. Typically this is uploaded or digitally streamed by an ad service or other content provider. Of course, the position of these elements may vary greatly, and any combination or sub-combination of these elements may be displayed.

Figure 11:
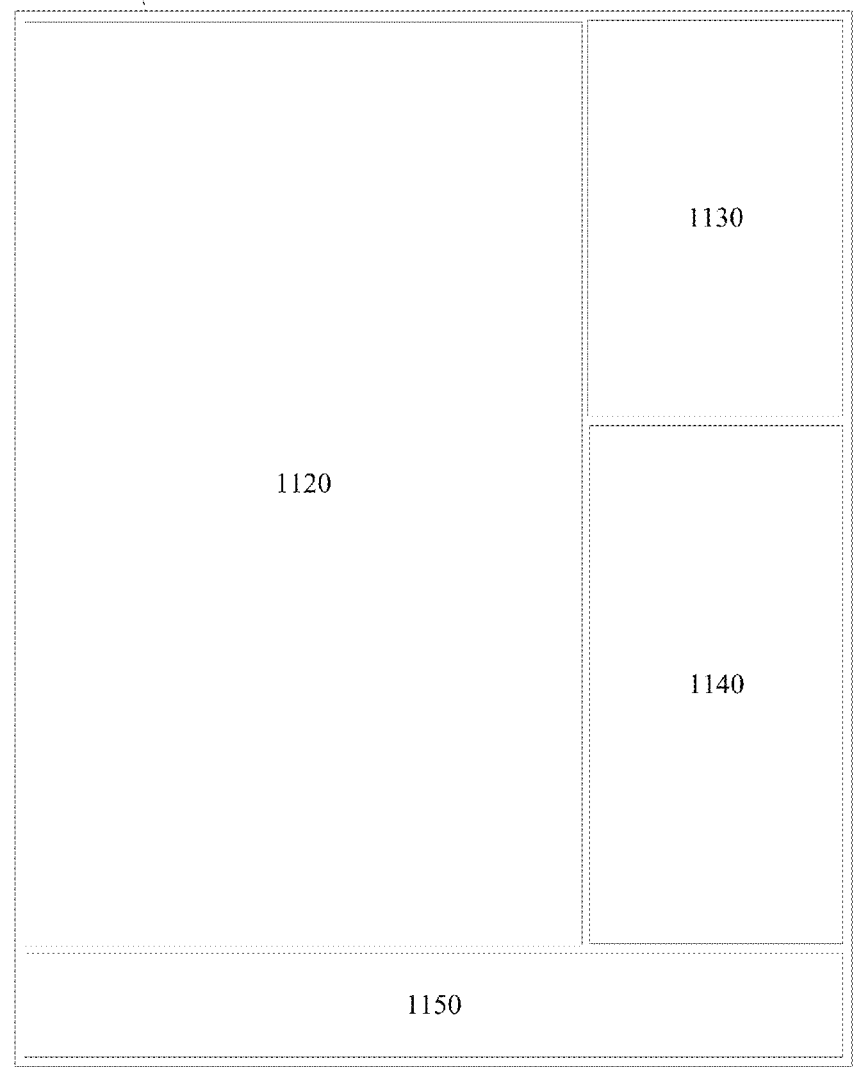
FIG. 11 illustrates an exemplary interface in which the entertaining experiences or interactive packages according to the disclosed embodiment are presented on a user device that is not also displaying the content.

FIG. 11 illustrates an exemplary interface in which the entertaining experiences or interactive packages according to the disclosed embodiment are presented on a user device that is not also displaying the content. As shown in FIG. 11, the interface is presented on a display 1110 of a user computing device, such as a smartphone, tablet, computer, and the like. In this configuration, the content is preferably displayed on a separate computing device, such as a television/interactive TV or a monitor (not shown in FIG. 11). In the alternative, the content may not be displayed on another computing device, and may instead be a live event which the user is attending, as described herein. On display 1110, entertaining experience or interactive package display portion 1120 may contain/display pictures, photographs or icon representations, text, questions, answers or other information. This content is added to entertaining experience or interactive package display portion 1120 through various inputs including download, digital streaming, via an analog device or other peripheral devices including apps or other programs developed on mobile devices, tablets, notebooks or netbooks. Community display portion 1130 may display community-related information and be directly tied to users/players that are either connected directly through social media applications, other applications, video applications, cameras, mobile applications, instant messaging, text, Twitter or inputted in some other manner. Content associated with users/players can be displayed as video, photographs, images, icons, or text. Scoring display portion 1140 may include information related to scores, and may be tied directly to how users/players (e) have completed the objectives of the entertaining experience or interactive package. This may include rankings, current scores, leaderboards, historical results, etc. This content can be added to scoring display portion 1140 through various inputs including download, digital streaming or via an analog device. Advertising display portion 1150 displays advertising in any form, such as text, images, or video. Typically this is uploaded or digitally streamed by an ad service or other content provider. Of course, the position of these elements may vary greatly, and any combination or sub-combination of these elements may be displayed.

EXAMPLES OF GAMES AS ENTERTAINING EXPERIENCES

The following are examples of games that can be played both dependently (staying within a single piece of content, e.g. a movie) or independently (moving between channels to play the game) and uses metadata that has been obtained from various sources.

Exemplary Game Category 1

Tagged Criteria

In these examples, content has been prescreened and tagged with game information, or metadata has been identified and exploited. Tagged or metadata criteria (text, objects, sounds, icons, etc.) have been identified and times noted and presented on screen. Users watch the content and interact by using appropriate devices to 'buzz in' during a certain time window when the tagged criteria appear in any way whatsoever. The game keeps track of the user's actions, scores, rankings or prestige (positive or negative) where certain criteria (or sequences thereof) can be worth more than others. Users can play individually, against or with other users, in real-time or time delayed. Prizes or cash or other rewards may be awarded.

Tagged Example 1

A user watches a program or programs that have been previously tagged with content. They can then be presented with a list of that content (text, objects, icons, audio, etc.) prior to or during the programming and attempt to identify that content. Once identified, the user then marks the content or buzzes in that this content has been found (possibly via touching or clicking on icons), and is awarded points or ranked appropriately based on some scoring method. The user may also be able to place some sort of bet on what the user will find, how many the user will find, or when the user will find this content.

Content may consist of, for example, objects (a glove, a taxi, etc.), cast members/characters, colors (anything red, blue objects, etc.), names, places, alphabet, shapes (triangles, circles, etc.), text (on screen or within the content), audio (buzz words, specific songs, artists or sound effects), defined moments (a base hit, someone yelling, an overused cliché, etc.), sports related (exciting plays, overlooked penalties, blown calls, etc.), introduction of content (actors enter, in-program advertising, etc.), frequency/number found, and the like.

In this type of entertaining experience, metadata used (or generated) may include, for example, title/name, genre (feature film, sitcom, sports broadcast, documentary, reality show, etc.), program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), bounding boxes (time stamped areas), and the like. User inputs may include, for example, touching content, buzzing in, entering text, time stamping, and the like.

Tagged Example 2

A user watches a program or programs and, using some sort of input interface, tags the content for use in a different entertainment experience. This tagging will "mark" the content with new metadata, keeping track of what the data is and when it was marked. In this case, the user may be competing against (or in cooperation with) other users to identify certain criteria and is awarded points or prizes based on their performance.

Content may include, for example, objects (a glove, a taxi, etc.), cast members/characters, colors (anything red, blue objects, etc.), names, places, alphabet, shapes (triangles, circles, etc.), text (on screen or within the content), audio (specific songs, artists or sound effects), defined moments (a base hit, someone yelling, an overused cliché, etc.), sports related (exciting plays, overlooked penalties, blown calls, etc.), introduction of content (actors enter, in-program advertising, etc.), frequency/number found, and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), bounding boxes (time stamped areas), and the like. User inputs may include, for example, touching content, buzzing in, entering text, annotating content, time stamping, and the like.

Exemplary Game Category 2

Voting Criteria

Users have been given a set of tasks to perform while programming has been initiated. These tasks revolve around keeping track of events related to the programming based on a goal. These goals may or may not be tied to the programming and may or may not include keeping track of objective or subjective likes or dislikes within the programming. The user then may vote on the popular consensus of a small or large sample of data either created by other users or obtained from other content producers or distributors.

Voting Example 1

A user watches a program, keeps track/votes on some sort of content (via touching or clicking on icons), and is presented with their final answers. Voting may use various systems like points, dollars, thumbs up/down, etc. Their answers can be tallied and ranked and users can be allowed to submit their votes or change them to what they think others might find most popular. Their answers can then be compared to the answers of others and points can be awarded and any leaderboards updated. The user may also be able to place some sort of bet on what their answers, the specific answers of others or the most popular answers in general.

Content may include, for example, funniest quips, most awkward moments, sports related (exciting plays, overlooked penalties, blown calls, etc.), best one-liners, scariest moments, best looking/hottest, and the like. In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, votes, moments, etc.), and the like. User inputs may include, for example, touching content, voting, ranking, entering text, time stamping, and the like.

Voting Example 2

A user watches a program and (either during the program, at the appropriate or arbitrary spot, or at the end of the program) casts votes or make predictions on information given in the program. They will then be scored based on providing the correct answer or another determination (how close to a specific dollar amount.). Scoring may be based on, for example, guessing the price of an object (valued, bought, sold, pawned), guessing the outcome of a decision (which house or storage locker to buy), sports related (outcome of a game, number of penalties, on-base percentage), guessing whodunit (killer, burglar, etc.), and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, votes, moments, etc.), and the like. User inputs may include, for example, touching content, voting, ranking, entering text, time stamping, and the like.

Voting Example 3

A user watches a program and questions can be presented to them during the program either as text, images or audio. These questions may or may not be tied to that specific program. The user answers these questions by typing or selecting an answer. The user's goal is to answer the questions based on what they feel will be the most popular answer selected by one or more other users. The user may also be able to place some sort of bet on answering the content. After the game, users may be rewarded with a video, image or audio that may or may not be tied to the program. Scoring may be based on, for example, multiple choice, true or false, enter a word, name, etc., and the like In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, votes, moments, etc.), and the like. User inputs may include, for example, touching content, voting, entering text, time stamping, Exemplary Game Category 3

Trivia Criteria

Users have been given a set of tasks to perform while programming has been initiated. These tasks revolve around questions that may or may not be related to the programming. The user may provide objective or subjective answers based on sample of data either created by other users or obtained from other content producers or distributors. For example, the user may watch a movie and using their device, answer questions based on the characters within the movie. They can then be shown correct or incorrect answers when the program (or partial program) is complete. The metadata used for these are most likely images/photos, cast name/characters, titles, summaries, and crew.

Trivia Example 1

A user watches a video clip, listens to an audio clip or views an image and may then be presented with questions either as video, text, images or audio. The user then answers these questions by typing or selecting an answer. The user may be competing against other users to correctly answer the questions or who can answer the question first. They may also be working in cooperation with other users and/or working in cooperation with other users while competing against similar groups. Scoring may be based on the correct answer, incorrect answers, time to enter an answer or all of the above. Some answers may be revealed or removed based on time. The user may also be able to place some sort of bet on answering the content. Scoring may also be based on, for example, multiple choice, true or false, enter a word, name, etc., and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like.

User inputs may include, for example, touching content, entering text, creating keywords, time stamping, and the like.

Trivia Example 2

A user watches media (a video clip, listens to an audio clip or image) in order to determine what the content or relevancy of the media. This media may be presented all at once or over the course of time. The user then types of selects an answer. The user may be competing against other users to correctly answer the questions or who can answer the question first. They may also be working in cooperation with other users and/or working in cooperation with other users while competing against similar groups. Scoring may be based on the correct answer, incorrect answers, time to enter an answer or all of the above. Some answers may be revealed or removed based on time. The user may also be able to place some sort of bet on answering the content. Scoring may also be based on, for example, multiple choice, true or false, enter a word, name, etc., and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, and the like.

Trivia Example 3

A user watches a program and questions can be presented to them during the program either as text, images or audio. The user answers these questions by typing or selecting an answer. The user may be competing against other users to correctly answer the questions or who can answer the question first. They may also be working in cooperation with other users and/or working in cooperation with other users while competing against similar groups. Scoring may be based on the correct answer, incorrect answers, time to enter an answer or all of the above. Some answers may be revealed or removed based on time. The user may also be able to place some sort of bet on answering the content. Scoring may be based on, for example, multiple choice, true or false, enter a word, name, etc., and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, and the like.

Trivia Example 4

A user plays a game of "hangman" where a word or phrase that may or may not be tied to the content is selected and black spaces or some other sort of presentation is presented to them. The user must then choose letters to fill in these spaces in hopes of identifying the word or phrase. Scoring may be based on the correct answer, incorrect answers, time to enter an answer or all of the above. The user may also be able to place some sort of bet on answering the content.

Play styles may include, for example, competing against other users to properly identify and enter words or phrases correctly, competing against other users to properly identify and enter words or phrases correctly in a race condition (either against other users or time), competing against other users to properly identify and enter words or phrases correctly in a turned-based condition (an incorrect answer moves the turn to the next user), working with other users to properly identify and enter words or phrases correctly, working with other users to properly identify and enter words or phrases correctly in a race condition (either against other users or time), working with other users to properly identify and enter words or phrases correctly in a turned-based condition (an incorrect answer moves the turn to the next user), and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, and the like.

Trivia Example 5

A user is presented with a 'madlib' sentence or phrase or story that may or may not be tied to the content. The user then uses some sort of input device (typing or selecting from a list of objects, text, images, etc.) To fill in one or more of the spaces within the madlib to complete a sentence, phrase or story. Scoring may be based on how others rate/vote for their madlib. Play styles may include, for example, competing against other users to properly identify and enter words or phrases that receive ratings/votes, cooperating with other users to properly identify and enter words or phrases that receive ratings/votes, and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, and the like.

Trivia Example 6

A user is presented with a crossword puzzle that has been created (either manually or automatically) from metadata that may or may not be based on the program they are viewing. The user must then choose letters to fill in these crossword spaces in hopes of identifying the word or phrase. Scoring may be based on the correct answer, incorrect answers, time to enter an answer or all of the above. The user may also be able to place some sort of bet on answering the content.

Play styles may include, for example, competing against other users to properly identify and enter words or phrases correctly, competing against other users to properly identify and enter words or phrases correctly in a race condition (either against other users or time), competing against other users to properly identify and enter words or phrases correctly in a turned-based condition (an incorrect answer moves the turn to the next user), working with other users to properly identify and enter words or phrases correctly, working with other users to properly identify and enter words or phrases correctly in a race condition (either against other users or time), working with other users to properly identify and enter words or phrases correctly in a turned-based condition (an incorrect answer moves the turn to the next user), and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, and the like.

Trivia Example 7

A user is presented with a word search puzzle that has been created (either manually or automatically) from metadata that may or may not be based on the program they are viewing. The user must then identify and select the letters in hopes of identifying the word or phrase. Scoring may be based on finding the correct words or phrases, incorrect words or phrases, time to find the words or phrases or all of the above. The user may also be able to place some sort of bet on answering the content.

Play styles may include, for example, competing against other users to properly identify the words or phrases correctly, competing against other users to properly identify the words or phrases correctly in a race condition (either against other users or time), competing against other users to properly identify the words or phrases correctly in a turned-based condition (an incorrect answer moves the turn to the next user), working with other users to properly identify the words or phrases correctly, working with other users to properly identify the words or phrases correctly in a race condition (either against other users or time), working with other users to properly identify the words or phrases correctly in a turned-based condition (an incorrect answer moves the turn to the next user), and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, and the like.

Exemplary Game Category 4

Live Events

Players, or users, have been encouraged to perform a number of tasks that may or may not be tied to a live event (concert, sporting, play, talent show, etc.) and may or may not include keeping track of objective or subjective likes or dislikes or ratings within the live event. The user then may cast a vote or multiple votes on both individual and popular consensus' of a small or large sample of data either created by other users or obtained from other content providers.

Live Event Example 1

Concert or Play

A user watches a live concert or play event (either being physically there or via broadcast) and keeps track/votes on some sort of content (via touching or clicking on icons), and is presented with their final answers. Voting may revolve around the performance of band members, play performers or the popularity of single songs or a set list. Their answers can be tallied and ranked and they can be allowed to submit their votes or change them to what they think others might find most popular. Their answers can then be compared to the answers of others and points can be awarded and any leaderboards can be updated. In this example, devices at the live event (i.e. jumbotrons, scoreboards, etc.) may display the leaderboards or any type of data generated during the entertaining or interactive experience. The user may also be able to place some sort of bet on what their answers, the specific answers of others or the most popular answers in general.

Content may include, for example, key performances, solos, etc., individual songs, cast members, set lists, set designs, best looking/hottest performers, and the like. In this type of entertaining experience, metadata used (or generated) may include, for example, title/name, location, set list, songs, instruments, summary/description, synopsis', images/photographs/video, players, other keywords, time-stamped content (images, audio, text, objects, etc.), time-stamped data (points, votes, moments, etc.), and the like. User inputs may include, for example, touching content, voting, ranking, entering text, time stamping, and the like.

Live Event Example 2

Sporting Event

A user watches a live concert or play event (either being physically there or via broadcast) and keeps track/votes on some sort of content (via touching or clicking on icons), and is presented with their final answers. Voting may revolve around the performance of an athlete, a team, a coach or the calls made by referees or umpires. Their answers can be tallied and ranked and users can be allowed to submit their votes or change them to what they think others might find most popular. User answers can then be compared to the answers of others and points can be awarded and any leaderboards can be updated. In this example, devices at the live event (i.e. jumbotrons, scoreboards, etc.) may display the leaderboards or any type of data generated during the entertaining or interactive experience. The user may also be able to place some sort of bet on their answers, the specific answers of others, or the most popular answers in general.

Content may include, for example, key performances, key plays, best/worst plays, best/worst calls, MVP players, coaching decisions, best looking/hottest athletes, and the like. In this type of entertaining experience, metadata used (or generated) may include, for example, title/name, location, teams, players, coaches, umpires/referees, summary/description, synopsis', images/photographs/video, other keywords, time-stamped content (images, audio, text, objects, etc.), time-stamped data (points, votes, moments, etc.), and the like. User inputs may include, for example, touching content, voting, ranking, entering text, time stamping, and the like.

Live Event Example 3

Talent Event

Where the user watches a live talent event (either being physically there or via broadcast) and keeps track/votes on some sort of content (via touching or clicking on icons), and is presented with their final answers. Voting may revolve around the performance of a performer (singer, dancer, magician, comedian, etc.). Their answers can be tallied and ranked and users can be allowed to submit their votes or change them to what they think others might find most popular. User answers can then be compared to the answers of others and points can be awarded and any leaderboards updated. In this example, devices at the live event (i.e. jumbotrons, scoreboards, etc.) may display the leaderboards or any type of data generated during the entertaining or interactive experience. The user may also be able to place some sort of bet on what their answers, the specific answers of others or the most popular answers in general.

Content may include, for example, key performances, most/least talented, best looking/hottest, funniest skit/joke, and the like. In this type of entertaining experience, metadata used (or generated) may include, for example, title/name, location, performers, summary/description, synopsis', images/photographs/video, other keywords, time-stamped content (images, audio, text, objects, etc.), time-stamped data (points, votes, moments, etc.), and the like. User inputs may include, for example, touching content, voting, ranking, entering text, time stamping, and the like.

Exemplary Game Category 5

Other Games

Users have been given a set of tasks to perform while programming has been initiated. These tasks revolve around ideas that don't fall into the other examples.

Other Example 1

A user is presented with clues that may or may not be based on programming content. Users use appropriate devices (remote controls, tablets, phones, etc.) To either view one program or move between the content (i.e. channel surfing) to locate the answers to these clues (metadata images, text or audio) in single or multiple rounds. Individual clues may change during the game offering users easier (or harder) hints as the game progresses (hot and cold for example). The game keeps track of the user's scores or rankings or prestige (positive or negative) as they find the clues. More points may be given for going to places that are more obscure. Prizes or cash or other rewards may be awarded.

Play styles may include, for example, competing against other users to find the clues based on a race condition, competing against other users to find the clues based on a correct answers, cooperating with other users to find the clues based on a race condition, cooperating with other users to find the clues based on a correct answers, and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), time-stamped data (points, answers, bets, etc.), and the like. User inputs may include, for example, touching content, entering text, creating keywords, time stamping, channel surfing data, and the like.

Other Example 2

A user views a program and annotates the video with their own metadata including (but not limited to) text, audio, video, and images. These annotations can be time stamped and used to create customized entertainment experiences that can be played back and annotated further if required. The game keeps track of the user's scores or rankings or prestige (positive or negative) as they participate in the experience. More points may be given for going to places that are more obscure. Prizes or cash or other rewards may be awarded.

Play styles may include, for example, competing against other users based on a race condition, competing against other users based on a correct answers, cooperating with other users based on a race condition, cooperating with other users based on a correct answers, and the like.

In this type of entertaining experience, metadata used (or generated) may include, for example, title/name, program service (Bravo, CBS, etc.), summary/description, synopsis', images/photographs/video, cast (actors, characters, bios, etc.), production crew (directors, producers, writers, etc.), other keywords (cheetahs, chainsaws, etc.), time-stamped content (images, audio, text, objects, etc.), and the like. User inputs may include, for example, touching content, entering text, creating keywords, time stamping, annotation data, and the like.

Figure 12:
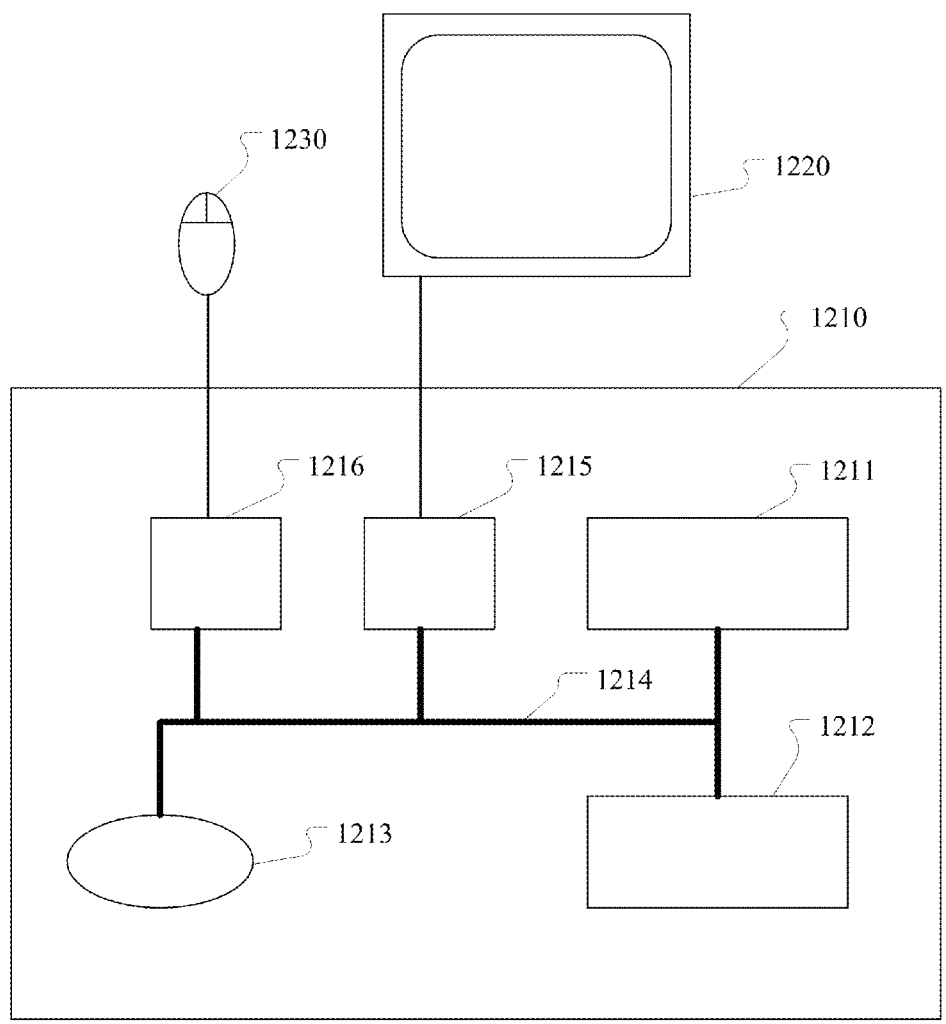
FIG. 12 illustrates an exemplary computer system according to the disclosed embodiment.

The embodiments described herein may also be implemented with any suitable hardware and/or software configuration, including, for example, modules executed on computing devices such as computing device 1210 of FIG. 12. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1210 has one or more processing device 1211 designed to process instructions, for example computer readable instructions (i.e., code) stored on a storage device 1213. By processing instructions, processing device 1211 may perform the steps set forth in the methods described herein. Storage device 1213 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1210 additionally has memory 1212, an input controller 1216, and an output controller 1215. A bus 1214 operatively couples components of computing device 1210, including processor 1211, memory 1212, storage device 1213, input controller 1216, output controller 1215, and any other devices (e.g., network controllers, sound controllers, etc.). Output controller 1215 may be operatively coupled (e.g., via a wired or wireless connection) to a display device 1220 (e.g., a monitor, television, mobile device screen, touch-display, etc.) In such a fashion that output controller 1215 can transform the display on display device 1220 (e.g., in response to modules executed). Input controller 1216 may be operatively coupled (e.g., via a wired or wireless connection) to input device 1230 (e.g., mouse, keyboard, touch-pad, scroll-ball, touch-display, etc.) In such a fashion that input can be received from a user (e.g., a user may input with an input device 1230 a dig ticket).

Of course, FIG. 12 illustrates computing device 1210, display device 1220, and input device 1230 as separate devices for ease of identification only. Computing device 1210, display device 1220, and input device 1230 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 1210 may be one or more servers, for example a farm of networked servers, a clustered server environment, or a cloud network of computing devices.

While systems and methods are described herein by way of example and embodiments, those skilled in the art recognize that the disclosed embodiment is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A computer-implemented method of providing user actionable tasks based on supplemental information associated with video content items, the method being implemented by a computer system that includes one or more physical processors executing one or more computer program instructions which, when executed, perform the method, the method comprising:

obtaining, by the computer system, supplemental information associated with a video content item responsive to a first presentation of the video content item;

obtaining, by the computer system, based on the supplemental information, task information that identifies one or more user actionable tasks associated with a game, wherein the first presentation of the video content item is independent of the game;

providing, by the computer system, based on the task information, the one or more user actionable tasks during the first presentation of the video content item;

obtaining, by the computer system, one or more user inputs corresponding to the one or more user actionable tasks, wherein the one or more user actionable tasks are related to prediction of at least one outcome that is presented during the first presentation of the video content item, and wherein at least one of the one or more user inputs comprises a prediction of a first outcome;

determining, by the computer system, one or more user scores to be assigned to a user based on whether the first outcome is realized during the first presentation of the video content item;

assigning, by the computer system, the one or more user scores to the user;

storing, by the computer system, the one or more user inputs corresponding to the one or more user actionable tasks as additional supplemental information for the video content item;

obtaining, by the computer system, the additional supplemental information responsive to a second presentation of the video content item, wherein the second presentation of the video content item comprises a rerun of the video content item occurring subsequent to the first presentation;

obtaining, by the computer system, based on the additional supplemental information, other task information that identifies one or more customized user actionable tasks; and providing, by the computer system, based on the other task information, the one or more customized user actionable tasks during the rerun of the video content item.

2. The method of claim 1, wherein the supplemental information comprises metadata associated with the video content item, and the additional supplemental information comprises additional metadata associated with the video content item.

3. The method of claim 2, wherein the metadata and the additional metadata each comprises at least one of content title, content description, closed captioning, images, pointers, tags, or keywords associated with the video content item.

4. The method of claim 1, wherein the rerun of the video content item comprises a broadcast rerun of the video content item, and wherein the one or more customized user actionable tasks are provided during the broadcast rerun of the video content item.

5. The method of claim 1, wherein the video content item comprises at least one of a movie or a television show episode, the first presentation of the video content item comprises an original airing or first rerun of the movie or television show episode, and the second presentation of the video content item comprises a second rerun of the movie or television show episode, and wherein the one or more customized user actionable tasks are provided during the second rerun of the movie or television show episode.

6. The method of claim 1, wherein the supplemental information includes user-generated information.

7. The method of claim 1, wherein the one or more user inputs originated from a user device of the user.

8. The method of claim 1, wherein the one or more user actionable tasks and the first presentation of the video content item are provided to a user device of the user.

9. An apparatus for providing user actionable tasks based on supplemental information associated with video content items, the apparatus comprising:

one or more physical processors programmed with one or more computer program instructions which, when executed, cause the one or more physical processors to:

obtain supplemental information associated with a video content item responsive to a first presentation of the video content item;

obtain, based on the supplemental information, task information that identifies one or more user actionable tasks associated with a game, wherein the first presentation of the video content item is independent of the game;

provide, based on the task information, the one or more user actionable tasks during the first presentation of the video content item;

obtain one or more user inputs corresponding to the one or more user actionable tasks, wherein the one or more user actionable tasks are related to prediction of at least one outcome that is presented during the first presentation of the video content item, and wherein at least one of the one or more user inputs comprises a prediction of a first outcome;

determine one or more user scores to be assigned to a user based on whether the first outcome is realized during the first presentation of the video content item;

assign the one or more user scores to the user;

store the one or more user inputs corresponding to the one or more user actionable tasks as additional supplemental information for the video content item;

obtain the additional supplemental information responsive to a second presentation of the video content item, wherein the second presentation of the video comprises a rerun of the video content item occurring subsequent to the first presentation;

obtain, based on the additional supplemental information, other task information that identifies one or more customized user actionable tasks; and provide, based on the other task information, the one or more customized user actionable tasks during the rerun of the video content item.

10. The apparatus of claim 9, wherein the supplemental information comprises metadata associated with the video content item, and the additional supplemental information comprises additional metadata associated with the video content item.

11. The apparatus of claim 10, wherein the metadata and the additional metadata each comprises at least one of content title, content description, closed captioning, images, pointers, tags, or keywords associated with the video content item.

12. The apparatus of claim 9, wherein the rerun of the video content item comprises a broadcast rerun of the video content item, and wherein the one or more customized user actionable tasks are provided during the broadcast rerun of the video content item.

13. The apparatus of claim 9, wherein the video content item comprises at least one of a movie or a television show episode, the first presentation of the video content item comprises an original airing or first rerun of the movie or television show episode, and the second presentation of the video content item comprises a second rerun of the movie or television show episode, and wherein the one or more customized user actionable tasks are provided during the second rerun of the movie or television show episode.

14. The apparatus of claim 9, wherein the supplemental information includes user-generated information.

15. The apparatus of claim 9, wherein the one or more user inputs originated from a user device of the user.

16. The apparatus of claim 9, wherein the one or more user actionable tasks and the first presentation of the video content item are provided to a user device of the user.

17. A computer-implemented method of providing user actionable tasks based on supplemental information associated with movies, the method being implemented by a computer system that includes one or more physical processors executing one or more computer program instructions which, when executed, perform the method, the method comprising:

obtaining, by the computer system, one or more user actionable tasks related to supplemental information associated with a movie responsive to a first presentation of the movie, wherein the one or more user actionable tasks are associated with a game, and wherein the first presentation of the movie is independent of the game;

providing, by the computer system, the one or more user actionable tasks during the first presentation of the movie;

obtaining, by the computer system, one or more user inputs corresponding to the one or more user actionable tasks, wherein the one or more user actionable tasks are related to prediction of at least one outcome that is presented during the first presentation of the movie, and wherein at least one of the one or more user inputs comprises a prediction of a first outcome;

determining, by the computer system, one or more user scores to be assigned to a user based on whether the first outcome is realized during the first presentation of the movie;

assigning, by the computer system, the one or more user scores to the user;

storing, by the computer system, the one or more user inputs corresponding to the one or more user actionable tasks as additional supplemental information for the movie;

generating, by the computer system, one or more customized user actionable tasks based on the stored additional supplemental information;

obtaining, by the computer system, the one or more customized user actionable tasks responsive to a second presentation of the movie, wherein the first presentation of the movie comprises an original airing or a first rerun of the movie, and wherein the second presentation of the movie comprises a second rerun of the movie;

providing, by the computer system, the one or more customized user actionable tasks during the second rerun of the movie.

18. The method of claim 17, wherein the supplemental information comprises metadata associated with the movie, and the additional supplemental information comprises additional metadata associated with the movie.

19. The method of claim 17, wherein the one or more user inputs originated from a user device of the user.

20. The method of claim 17, wherein the one or more user actionable tasks and the first presentation of the movie are provided to a user device of the user.

21. The method of claim 17, wherein the supplemental information includes user-generated information.

22. An apparatus for providing user actionable tasks based on supplemental information associated with movies, the apparatus comprising:

one or more physical processors programmed with one or more computer program instructions which, when executed, cause the one or more physical processors to:

obtain one or more user actionable tasks related to supplemental information associated with a movie responsive to a first presentation of the movie, wherein the one or more user actionable tasks are associated with a game, and wherein the first presentation of the movie is independent of the game;

provide the one or more user actionable tasks during the first presentation of the movie;

obtain one or more user inputs corresponding to the one or more user actionable tasks, wherein the one or more user actionable tasks are related to prediction of at least one outcome that is presented during the first presentation of the movie, and wherein at least one of the one or more user inputs comprises a prediction of a first outcome;

determine one or more user scores to be assigned to a user based on whether the first outcome is realized during the first presentation of the movie;

assign the one or more user scores to the user;

store the one or more user inputs corresponding to the one or more user actionable tasks as additional supplemental information for the movie; generate one or more customized user actionable tasks based on the stored additional supplemental information;

obtain the one or more customized user actionable tasks responsive to a second presentation of the movie, wherein the first presentation of the movie comprises an original airing or a first rerun of the movie, and wherein the second presentation of the movie comprises a second rerun of the movie;

provide the one or more customized user actionable tasks during the second rerun of the movie.

23. The apparatus of claim 22, wherein the supplemental information comprises metadata associated with the movie, and the additional supplemental information comprises additional metadata associated with the movie.

24. The apparatus of claim 22, wherein the one or more user inputs originated from a user device of the user.

25. The apparatus of claim 22, wherein the one or more user actionable tasks and the first presentation of the movie are provided to a user device of the user.

26. The apparatus of claim 22, wherein the supplemental information includes user-generated information.

27. A computer-implemented method of providing user actionable tasks based on supplemental information associated with television show episodes, the method being implemented by a computer system that includes one or more physical processors executing one or more computer program instructions which, when executed, perform the method, the method comprising:

obtaining, by the computer system, one or more user actionable tasks related to supplemental information associated with a television show episode responsive to a first presentation of the television show episode, wherein the one or more user actionable tasks are associated with a game, and wherein the first presentation of the television show episode is independent of the game;

providing, by the computer system, the one or more user actionable tasks during the first presentation of the television show episode;

obtaining, by the computer system, one or more user inputs corresponding to the one or more user actionable tasks, wherein the one or more user actionable tasks are related to prediction of at least one outcome that is presented during the first presentation of the television show episode, and wherein at least one of the one or more user inputs comprises a prediction of a first outcome;

determining, by the computer system, one or more user scores to be assigned to a user based on whether the first outcome is realized during the first presentation of the television show episode;

assigning, by the computer system, the one or more user scores to the user;

storing, by the computer system, the one or more user inputs corresponding to the one or more user actionable tasks as additional supplemental information for the television show episode;

generating, by the computer system, one or more customized user actionable tasks based on the stored additional supplemental information;

obtaining, by the computer system, the one or more customized user actionable tasks responsive to a second presentation of the television show episode, wherein the first presentation of the television show episode comprises an original airing or a first rerun of the television show episode, and wherein the second presentation of the television show episode comprises a second rerun of the television show episode;

providing, by the computer system, the one or more customized user actionable tasks during the second rerun of the television show episode.

28. The method of claim 27, wherein the supplemental information comprises metadata associated with the television show episode, and the additional supplemental information comprises additional metadata associated with the television show episode.

29. The method of claim 27, wherein the one or more user inputs originated from a user device of the user.

30. The method of claim 27, wherein the one or more user actionable tasks and the first presentation of the television show episode are provided to a user device of the user.

* * * * *